United States Patent
Jöngren

(10) Patent No.: US 8,331,476 B2
(45) Date of Patent: Dec. 11, 2012

(54) METHOD FOR DETECTING TRANSMISSION MODE IN A SYSTEM USING MULTIPLE ANTENNAS

(75) Inventor: George Jöngren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 370 days.

(21) Appl. No.: 12/530,982

(22) PCT Filed: May 5, 2008

(86) PCT No.: PCT/SE2008/050507
§ 371 (c)(1),
(2), (4) Date: Sep. 11, 2009

(87) PCT Pub. No.: WO2008/136750
PCT Pub. Date: Nov. 13, 2008

(65) Prior Publication Data
US 2010/0046651 A1 Feb. 25, 2010

(30) Foreign Application Priority Data
May 8, 2007 (SE) ...................... 0701119

(51) Int. Cl.
*H04B 7/02* (2006.01)
(52) U.S. Cl. ...................................... 375/267
(58) Field of Classification Search ......... 375/260, 375/262, 265, 267, 347; 370/208, 210, 335, 370/337, 342, 344, 350; 455/500, 78, 83, 455/88, 553.1, 132
See application file for complete search history.

(56) References Cited

U.S. PATENT DOCUMENTS

| | | | |
|---|---|---|---|
| 7,526,258 B2 | 4/2009 | Nakao et al. | |
| 8,149,810 B1 * | 4/2012 | Narasimhan et al. | 370/329 |
| 2004/0082356 A1 * | 4/2004 | Walton et al. | 455/522 |

(Continued)

FOREIGN PATENT DOCUMENTS
JP 2006197649 A 7/2006

OTHER PUBLICATIONS
International Search Report for PCT/SE2008/050507 mailed Oct. 10, 2008.

(Continued)

*Primary Examiner* — Young T. Tse
(74) *Attorney, Agent, or Firm* — Potomac Patent Group PLLC

(57) ABSTRACT

A user terminal, a communication network, a computer readable medium and a method for selecting at the user terminal a reception and decoding of a transmission mode used by a base station, the user terminal receiving communicated information from the base station, which has multiple antennas, via plural channels, the plural channels including a primary broadcast channel and at least one control channel. The method includes receiving at the user terminal initiating data from the base station via the primary broadcast channel, detecting from the received initiating data whether a first or a second transmission mode is used by the base station for the primary broadcast channel, the first transmission mode indicating that a first number of antennas are used by the base station and the second transmission mode indicating that a second number, different than the first number, of antennas are used by the base station to communicate with the user terminal, and using the detected first or second transmission mode of the primary broadcast channel to decode the at least one control channel.

26 Claims, 10 Drawing Sheets

U.S. PATENT DOCUMENTS

| | | | |
|---|---|---|---|
| 2004/0209579 A1* | 10/2004 | Vaidyanathan | 455/101 |
| 2006/0034385 A1 | 2/2006 | Egashira et al. | |
| 2006/0109931 A1 | 5/2006 | Asai et al. | |
| 2009/0176463 A1* | 7/2009 | Raaf et al. | 455/101 |
| 2010/0046445 A1* | 2/2010 | Sawahashi et al. | 370/329 |

OTHER PUBLICATIONS

International Preliminary Report on Patentability for PCT/SE2008/050507 mailed Jul. 3, 2009.

3GPP TS 25.212 v7.4.0, "3rd Generation Partnership Project; Technical Specification Group Radio Access Network; Multiplexing and channel coding (FDD) (Release 7)," Technical Specification, Mar. 2007, pp. 92-93.

Ericsson, "BCH Transport Channel," Joint RAN 1/RAN2 Meeting on LTE, R2-060864, Athens, Greece Mar. 27-31, 2006, pp. 1-2.

Etri, "Cell Search Scheme for EUTRA," 3GPP RAN WG1 #44 Meeting, R1-060426, Denver, USA, Feb. 13-17, 2006, pp. 1-13.

Dahlman, E. et al., "3G Evolution: HSPA and LTE for Mobile Broadband", p. 121, Elsevier, (First Edition 2007).

Japanese Office Action in corresponding Japanese Application No. 2010-507362 mailed Jun. 22, 2012.

* cited by examiner

METHOD FOR DETECTING TRANSMISSION MODE IN A SYSTEM USING MULTIPLE ANTENNAS

RELATED APPLICATIONS

This application claims priority and benefit from International Application No. PCT/SE2008/050507, filed May 5, 2008, which claims priority to Swedish patent application No. 0701119-0, filed May 8, 2007, the entire teachings of which are incorporated herein by reference.

TECHNICAL FIELD

The present invention generally relates to radio communication systems, devices, software and methods and, more particularly, to mechanisms and techniques for selecting a transmission mode of a base station.

BACKGROUND

During the past years, the interest in radio access technologies for providing services for voice, video and data has increased. There are various telecom technologies used in cellular communications. The most widespread radio access technology for mobile communication is digital cellular. Increased interest is shown in 3G (third generation) systems. 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radiocommunications in the decades to come.

To increase the transmission rate of the systems and to provide additional diversity against fading on the radio channels, modern wireless communication systems include transceivers that use multi-antennas (often referred to as MIMO systems). The multi-antennas may be distributed to the receiver side, to the transmitter side and/or at both sides as shown in FIG. 1. More specifically, FIG. 1 shows a base station 10 having four antennas 12 and a user terminal 14 having two antennas 12. The number of antennas shown in FIG. 1 is exemplary and not intended to limit the actual number of antennas used at the base station or at the user terminal in the exemplary embodiments to be discussed latter.

The term "base station" is used in the following as a generic term. As it is known, in the Wideband Code Division Multiple Access (WCDMA) architecture, a NodeB may correspond to the base station. In other words, a base station is a possible implementation of the NodeB. However, the NodeB is broader than the conventional base station. The NodeB refers in general to a logical node. A NodeB in WCDMA is handling transmission and reception in one or several cells, as shown for example in FIG. 2. FIG. 2 shows two NodeB 10 and one user terminal 14. The user terminal 14 uses dedicated channels 16 to communicate with the NodeB 10. The two NodeBs 10 are wired to corresponding Radio Network Controllers (RNC) 18. One RNC 18 may control more than one NodeB 10. The RNCs 18 are connected to a Core Network 20. For the LTE architecture, there is a single node, the eNodeB. One possible LTE architecture is shown in FIG. 3, in which the eNodeB 22 may include a physical layer PHY 24, a medium access control MAC 26, a radio link control RLC 28, and a packet data convergence protocol PDCP 30.

Although conventionally the term "base station" is narrower than the NodeB of the WCDMA architecture or the eNodeB of the LTE architecture, the term "base station" is used in the following embodiments as defining the NodeB, eNodeB or other nodes specific for other architectures. Thus, the term "base station" defined and used in the present disclosure is not limited to the conventional base station unit of a network.

LTE was designed to support a number of antennas, for example 1, 2 or 4 antennas. To perform downlink coherent demodulation at the receiver side, the user terminal needs estimates of the downlink channel. One way to enable channel estimation in case of orthogonal frequency-division multiplexing (OFDM) transmission that is used in LTE systems, is to insert known reference symbols into the OFDM time-frequency grid, as shown for example in FIG. 4. As illustrated in FIG. 4, downlink reference symbols 40 are inserted within predetermined OFDM symbols of each slot and with a frequency-domain spacing of, for example, six subcarriers (the downlink reference symbols are not shown to scale in FIG. 4).

To estimate the channel over the entire time-frequency grid, the user terminal may perform interpolation/averaging over multiple reference symbols. Thus, when estimating the channel for a certain resource block (shown for example in FIG. 5), the user terminal may not only use the reference symbols within that resource block but also, in the frequency domain, use neighbor resource blocks, as well as reference symbols of previously received slots/frames. However, the extent to which the user terminal can average over multiple resource blocks in the frequency and/or time domain depends on the channel characteristics. In case of high channel frequency selectivity, the possibility for averaging in the frequency domain is limited. Similarly, the possibility of time-domain averaging, that is the possibility to use reference symbols in previously received slots/subframes, is limited in case of fast channel variations, for example, due to high user terminal velocity.

Generally, to estimate the downlink channel corresponding to each transmit antenna of a transmitting unit, there is one downlink reference signal transmitted from each antenna. In case of two transmit antennas, the reference symbols of the second antenna are frequency multiplexed with the reference symbols of the first antenna, as shown for example in FIG. 6a. In case of four transmit antennas, the reference symbols for the third and fourth antennas are frequency multiplexed within the second OFDM symbol of each slot as shown in FIG. 6b. The reference symbols for antennas three and tour may only be transmitted within one OFDM symbol of each slot. To avoid interference between the reference symbols from various antennas, a resource element carrying a reference symbol for a certain antenna carries no information about the other antennas.

In the case of four transmit antennas, the time-domain reference-symbol density of the third and fourth antennas is reduced compared to the first and second antennas. This arrangement is used to limit the reference-signal overhead in case of four transmit antennas. At the same time, this arrangement has a negative impact on the possibility to track very fast channel variations. This arrangement in LTE systems is maintained because four-antenna spatial multiplexing is applied mainly to scenarios involving low mobility of the user terminal. The reason for retaining the higher reference-symbol density for the first and second antennas in case of four transmit antennas is that it is assumed in LTE systems that these reference signals will be used as part of the initial cell search during which the user terminal has not yet acquired full information about the number of transmit antennas within the cell. Thus, the configuration of the reference signals of the first and second antennas are the same regardless of the number of antennas.

The reference signals and other information initially needed by the user terminal to connect and exchange data with the base station may be achieved via a primary broadcast channel (BCH). In practice, several channels are needed for the user terminal to connect to a certain cell. After acquiring synchronization information by using a synch channel (SCH), the user terminal may decode the primary broadcast channel to obtain at least the minimum system information needed to decode the other channels, including a secondary broadcast channel and/or L1/L2 control channels. Both the synch channel and primary broadcast channel may be transmitted, in one exemplary embodiment, from the base station at regular intervals. The primary broadcast channel has a predetermined number of bits allocated for each frame and each bit may be used to communicate pre-established information about the system. However, it is expensive and difficult to allocate a bit of the primary broadcast channel to include information about the number of antennas used by the base station, information that is need as will be discussed next.

To be able to adapt from low speed scenarios to high speed scenarios, the user terminal will need to support at least two different transmit diversity modes, for two and four antennas, respectively. To decode these modes, accurate channel estimates are needed. As discussed above, common reference symbols are used as training data for computing such estimates. The reference symbols are distributed on all transmit antennas of the base station to allow estimation of the channels of all the antennas. As discussed above, the reference symbols density is lower on transmit antenna three and four to keep the signaling overhead low. This fact reduces the performance of the user terminal at high speed scenarios. Thus, the existing techniques used for high speed scenarios employ transmission modes which utilize only two antennas at the base station, wasting the transmission capabilities of the remaining two antennas.

Thus, it would be desirable to provide methods, devices, systems and software that avoid the afore-described problems and drawbacks.

SUMMARY

According to one exemplary embodiment, there is a method for selecting at a user terminal to receive and decode a transmission mode used by a base station. The user terminal communicates via plural channels with the base station, which has multiple antennas, and the plural channels include a primary broadcast channel and at least one control channel. The method includes receiving at the user terminal initiating data from the base station via the primary broadcast channel; detecting from the received initiating data whether a first or a second transmission mode is used by the base station for the primary broadcast channel, the first transmission mode indicating that a first number of antennas are used by the base station and the second transmission mode indicating that a second number, different than the first number, of antennas are used by the base station to communicate with the user terminal; and using the detected first or second transmission mode of the primary broadcast channel to decode the at least one control channel.

According to another exemplary embodiment, a communication user terminal selects a reception of a transmission mode of data transmitted from a base station via plural channels to the user terminal, the plural channels including a primary broadcast channel and at least one control channel. The user terminal includes at least one antenna configured to receive initiating data from the base station via the primary broadcast channel; and a processor connected to the at least one antenna and configured to detect from the received initiating data whether a first or second transmission mode is used by the base station for the primary broadcast channel. The first transmission mode indicates that a first number of antennas are used by the base station and the second transmission mode indicates that a second number, different than the first number, of antennas are used by the base station to communicate with the user terminal. The processor is also configured to use the detected first or second transmission mode of the primary broadcast channel to decode the at least one control channel.

According to still another exemplary embodiment, a communication network includes a base station having one or more antennas and configured to transmit, via plural channels including a primary broadcast channel and at least one control channel, initiating data using first or second transmission modes. The first transmission mode indicates that a first number of antennas are used by the base station and the second transmission mode indicates that a second number, different than the first number, of antennas are used by the base station to transmit the initiating data. The communication network further includes a user terminal configured to receive the initiating data via the primary broadcast channel to detect from the received initiating data whether the first or second transmission mode is used by the base station for the primary broadcast channel, and to use the detected first or second transmission mode of the primary broadcast channel to decode the at least one control channel.

According to another exemplary embodiment, there is a method for selecting at a base station transmission and coding of a transmission mode used by the base station to communicate information to a user terminal via plural channels, the base station having multiple antennas and the plural channels including a primary broadcast channel and at least one control channel. The method includes selecting at the base station a first or a second transmission mode for the primary broadcast channel, the first transmission mode indicating that a first number of antennas are used by the base station and the second transmission mode indicating that a second number, different than the first number, of antennas are used by the base station to communicate with the user terminal; determining at the base station a transmission mode for the at least one control channel, wherein the determining is performed based on the selected first or second transmission mode of the primary broadcast channel; encoding at the base station signals based on selected transmission modes; and sending from the base station the encoded signals to the user terminal via the primary broadcast channel and the at least one control channel.

According to another exemplary embodiment, a computer readable medium stores computer executable instructions, where the instructions, when executed by a processor of a user terminal, cause the user terminal to select a transmission mode used by a base station, the user terminal communicating via plural channels with the base station, which has multiple antennas, the plural channels including a primary broadcast channel and at least one control channel. The instructions stored on the computer readable medium instruct the processor to receive at the user terminal initiating data from the base station via the primary broadcast channel; detect from the received initiating data whether a first or a second transmission mode is used by the base station for the primary broadcast channel, the first transmission mode indicating that a first number of antennas are used by the base station and the second transmission mode indicating that a second number, different than the first number, of antennas are used by the base station to communicate with the user terminal; and use the detected first or second transmission mode of the primary broadcast channel to decode the at least one control channel.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of LTE systems described above. However, the embodiments to be discussed next are not limited to LTE systems but may be applied to other existing telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
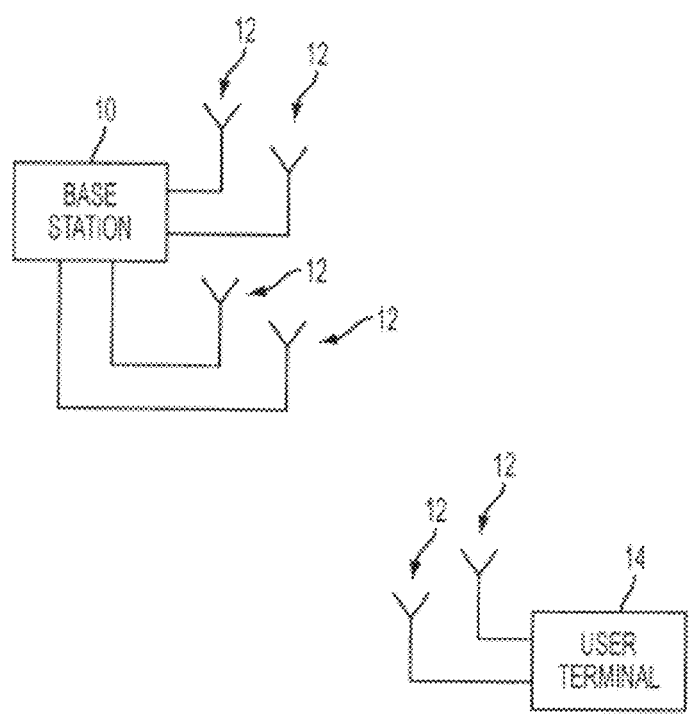
FIG. 1 illustrates a transmission structure including a base station and a user terminal, each having plural antennas.
Figure 2:
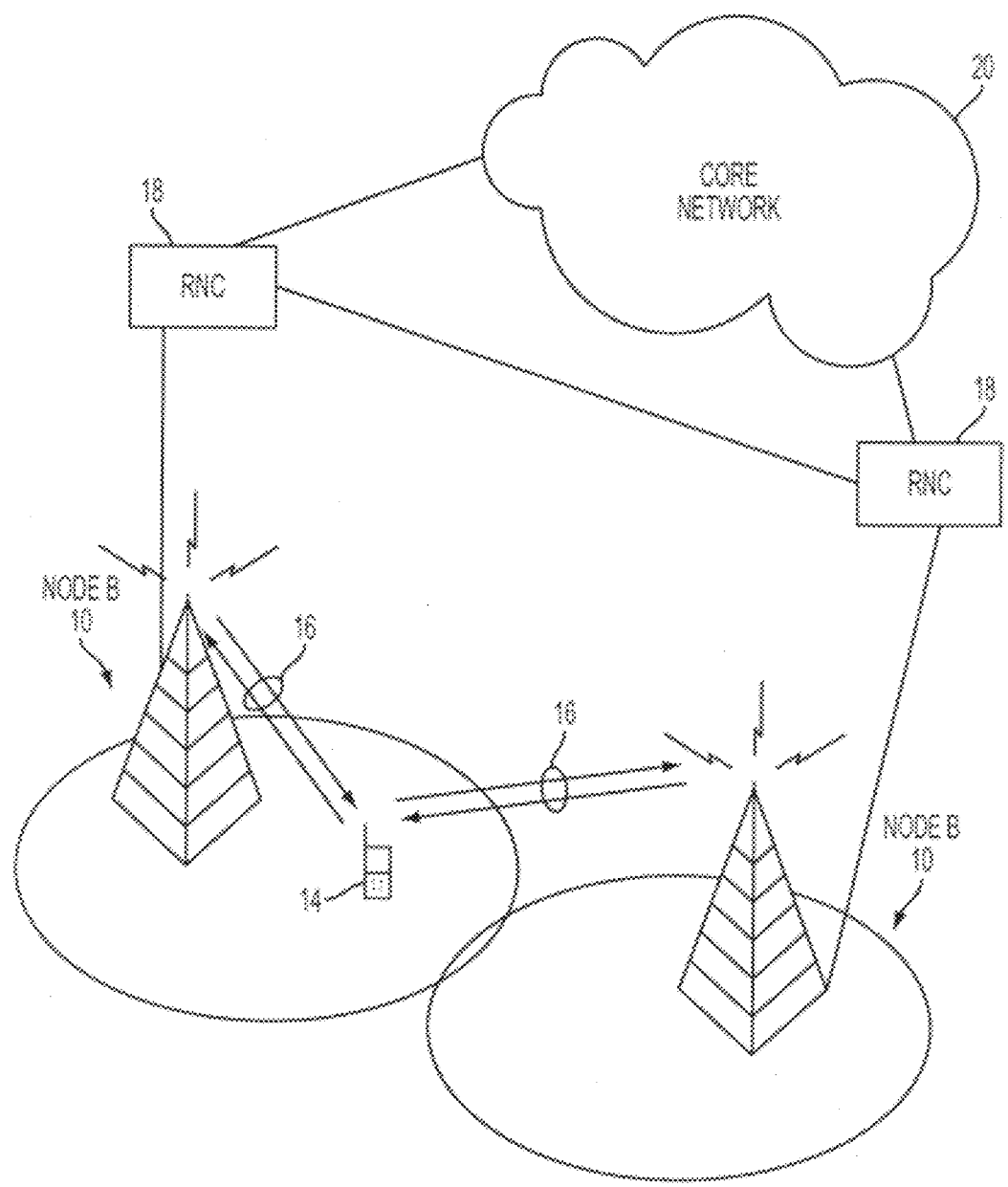
FIG. 2 illustrates the WCDMA architecture including the Node B.
Figure 3:
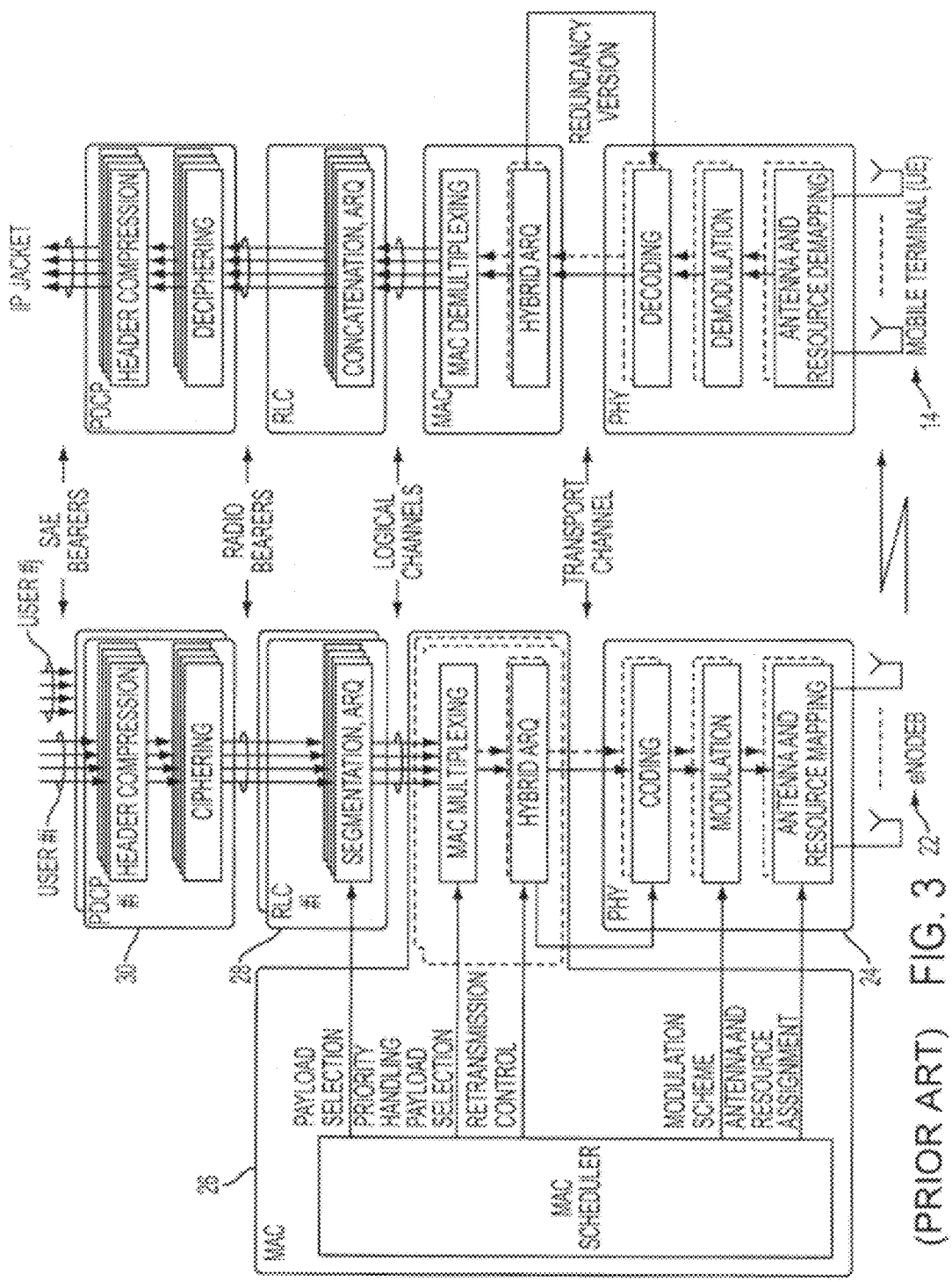
FIG. 3 illustrates the LTE architecture including the eNodeB.
Figure 4:
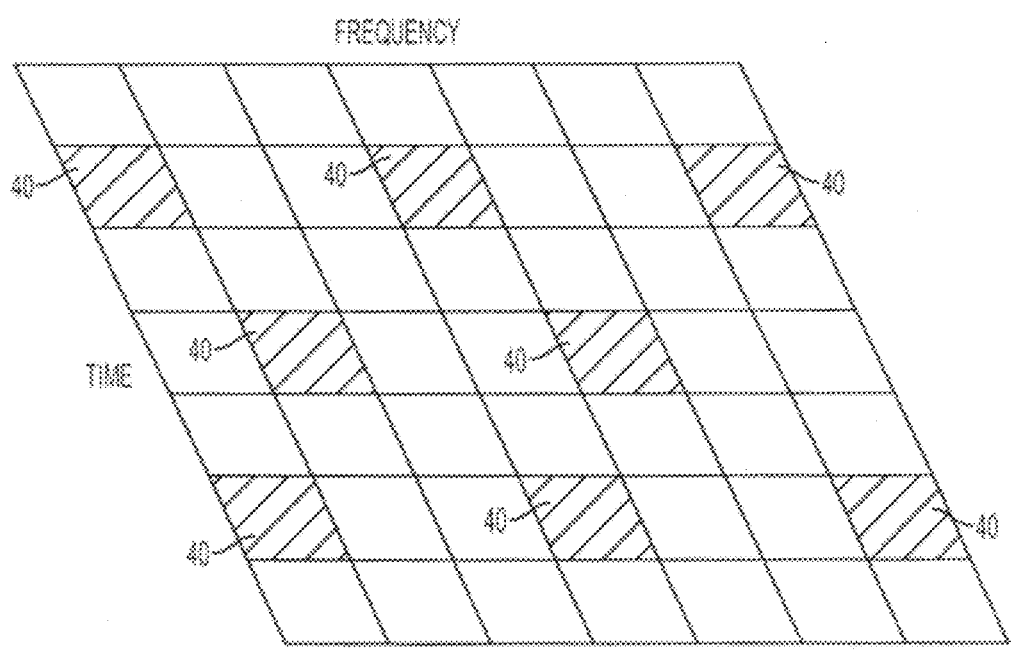
FIG. 4 illustrates reference symbols included into an OFDM time-frequency grid.
Figure 5:
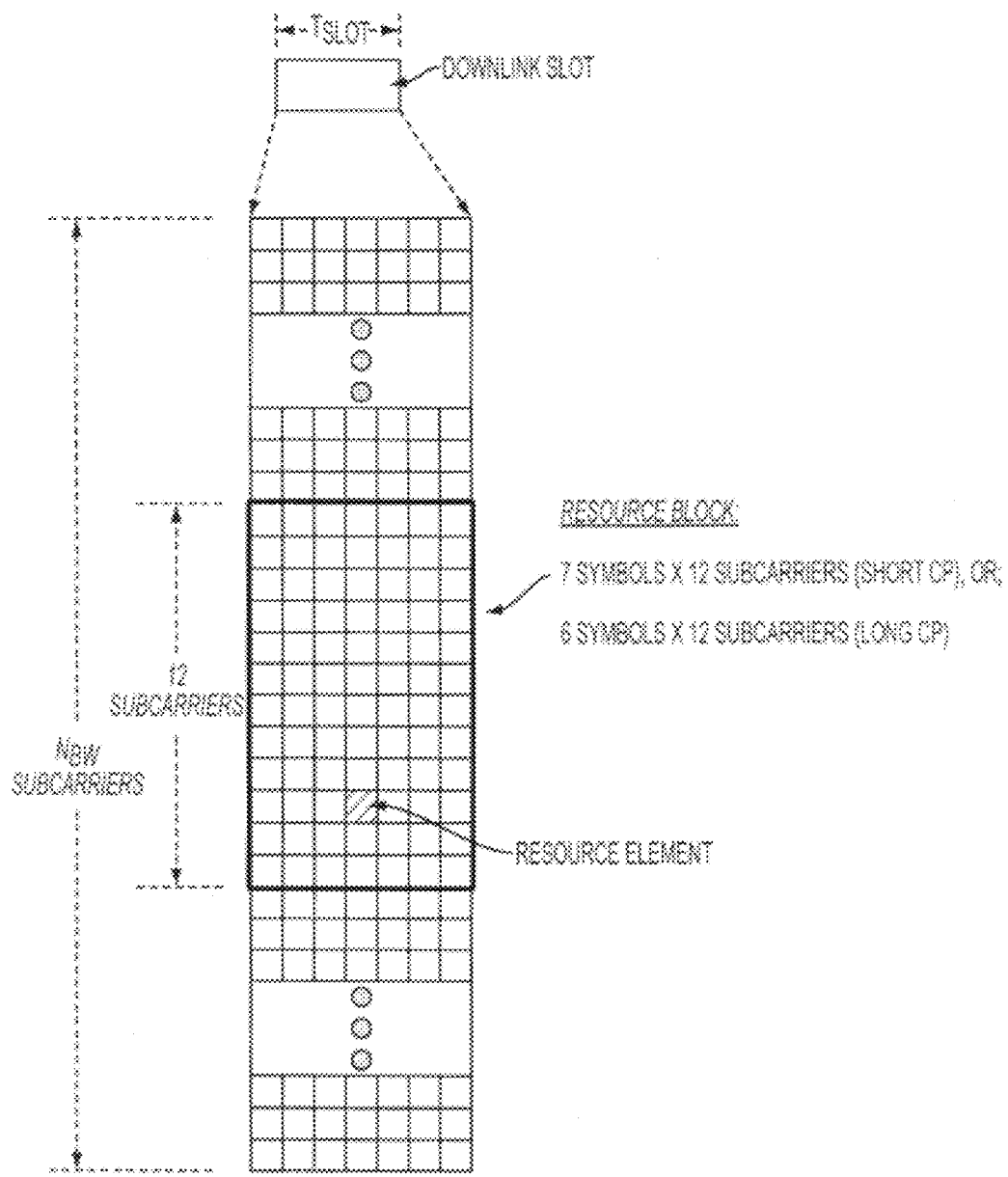
FIG. 5 illustrates a resource block.
Figure 6B:
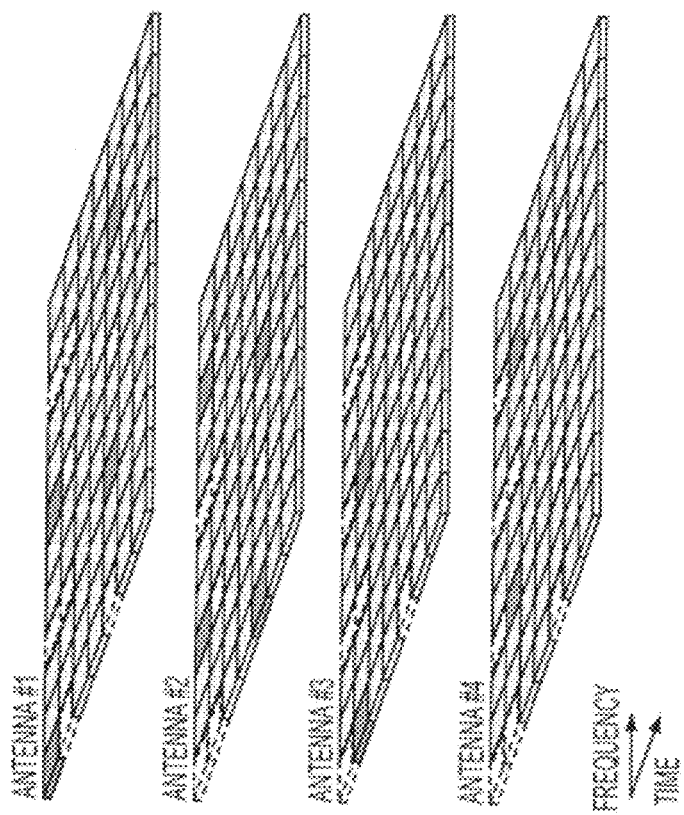
FIGS. 6(a) and (b) illustrate the distribution of the reference symbols for 2- and 4-antennas, respectively.
Figure 6A:
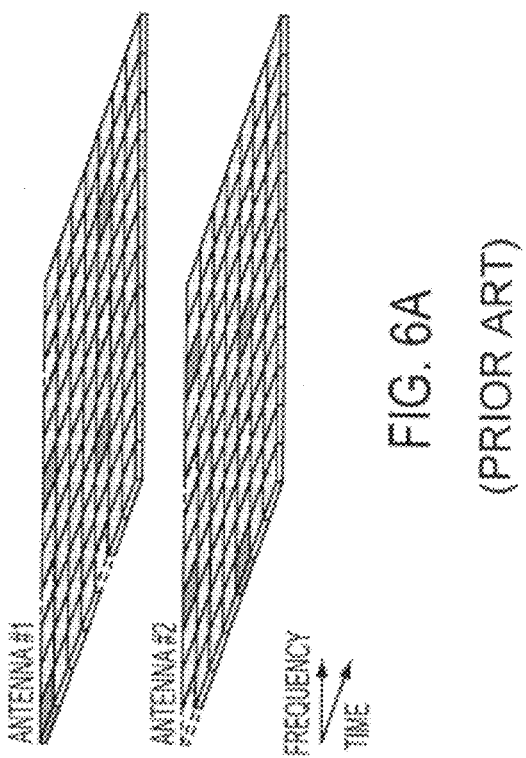
Figure 7:
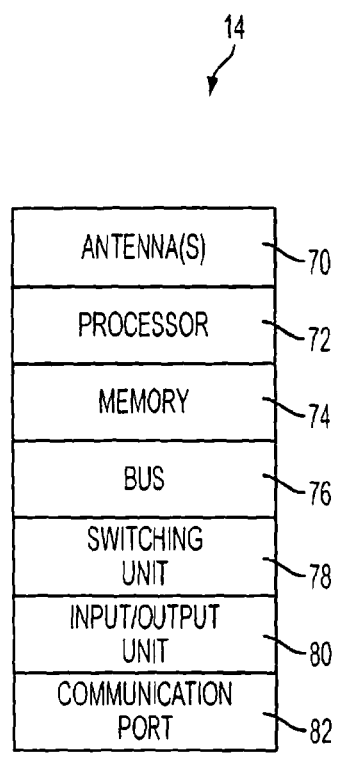
FIG. 7 illustrates a generic structure of the user terminal.

FIG. 7 shows a generic structure of the user terminal 14 according to an exemplary embodiment. The user terminal 14 includes one or more antennas 70 connected to processor 72. The processor 72 is configured to analyze and process signals received via the antennas 70. The processor 72 is connected to a memory 74 via a bus 76. One skilled in the art would understand from FIG. 7 that each shown element may be implemented as electrical circuitry, software instructions or a combination of these two possibilities. The user terminal 14 may also include a switching unit 78 configured to switch from a transmission mode to another transmission mode. Other units and/or elements are, for example, an input/output unit 80 that allows a user to input commands to the processor unit 72 or a communication port 82 that allows the user terminal 14 to receive data from another communication system. Further units, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art.

Next, the signaling between the base station and the user terminal for initiating data exchange and for selecting a transmission mode for the data exchange is discussed. The synch channel may provide the user terminal, in addition to synchronization information, with information about whether the transmission of data on the primary broadcast channel relies on one or several antenna ports (or antennas). The LTE specifications consider that an antenna port is defined by the presence of an antenna-port-specific reference signal. Thus, if identical reference signals are transmitted from several physical antennas, these antennas cannot be resolved from a user terminal point-of-view and the antennas can be jointly seen as a single antenna port. However, if each antenna uses a reference signal not used by the remaining antennas, there is a one to one mapping between the physical antennas and the antenna ports. To simplify the description of the exemplary embodiments, the term "antenna" will be used in the following.

Prior to decoding the primary BCH, when the user terminal receives signals from the base station (e.g., the synch channel) and the user terminal detects that multiple antenna ports are used by the base station to communicate data over the primary broadcast channel, a distinction between two and four antenna ports is not made and thus, the user terminal is not aware of the exact number of antenna ports. In some embodiments, the user terminal cannot even distinguish between single and multiple antenna ports. Hence, if the base station uses a non-transparent multi-antenna transmission scheme for the primary broadcast channel, the user terminal has to blindly detect the transmission scheme for the communication channels. In one embodiment, if the transmit diversity mode used by the base station directly corresponds to the number of transmit antennas, then the blind decoding also provides information about the number of antenna ports at the base station, and the same number is also used for the other control channels. However, this is not the case in all the exemplary embodiments and thus, this simple mapping between the diversity mode and the number of transmit antennas fails for specific cases.

As discussed above, because of, for example, lower reference signal density on antenna ports three and four, there might be reasons (e.g., high mobility of the user terminal) to use 2 Tx transmit diversity for the primary broadcast channel and possibly other control channels even though four antenna ports are present. Thus, for this embodiment, the number of transmit modes (two) does not correspond to the number of antenna ports (four), i.e., the control channels are not necessarily transmitted with the same number of antennas as there are antenna ports in the system. Therefore, the number of antennas for the data channels may differ from the number of antennas used for the control channels. Under this scenario, there is however a need to signal to the user terminal the actual number of antenna ports. This signaling may be performed on the primary broadcast channel in order to make it possible to decode the remaining channels (control channels) by avoiding blind detection for these channels, which may be complex or even unreliable. However, it is expensive from a signaling overhead point of view to allocate a message field on the primary broadcast channel for this type of information, so the primary broadcast channel in LTE does not contain such a field.

Besides the primary broadcast channel, the LTE specifications reference a secondary broadcast channel, which also contains system information. This channel may vary in size depending on the payload and information along this channel may be transmitted at a lower rate than the primary broadcast channel. This added flexibility of the secondary broadcast channel offers therefore, in one exemplary embodiment, the possibility to introduce in the secondary broadcast signal additional information bits rather than in the primary broadcast channel, in which each bit is already used and where the fixed number of bits means the primary broadcast channel needs to be designed to handle the worst case in terms of, for example, coverage. Thus, by using the secondary broadcast channel to signal to the user terminal, for example, the number of antenna ports used by the base station, the signaling overhead incurred by the primary broadcast channel may be maintained to a minimum.

According to an exemplary embodiment, the signaling of the number of antenna ports is not performed via the primary broadcast channel but is deferred to one/some of the control channels decoded after decoding the primary broadcast channel. Thus, according to this exemplary embodiment, signaling the number of antenna ports on the primary broadcast channel is avoided while still being able to use either 2 Tx or 4 Tx transmission modes for common control and L1/L2 control channels. Even though the number of antenna ports is unknown after the decoding the primary broadcast channel, according to an exemplary embodiment, the common control and L1/L2 control channels may be decoded without the need of the blind detection of the transmit diversity mode used for these channels. This is achieved by ensuring that the number of antenna ports used for transmitting the control channels (in LTE e.g., secondary broadcast channel and physical downlink control channels (PDCCH)) decoded after decoding the primary broadcast channel is a known deterministic function of the number of antenna ports used for the primary broadcast channel. For example, it may be decided that the base station emits the primary broadcast channel using a first transmission mode and emits the control channels using a second transmission mode or vice versa or the base station uses the same transmission mode for both the primary broadcast channel and the control channels. Thus, by blindly detecting the transmission mode of the primary broadcast channel, the transmission mode for the control channels is known.

In order to signal the number of transmit antennas on channels decoded after the primary broadcast channel has been decoded, e.g., secondary broadcast channel, in one exemplary embodiment, the transmission mode used for the primary broadcast channel is blindly detected. Examples of blindly detecting the transmission mode for the primary broadcast channel include trying to decode the received signals assuming different transmission modes. For each assumed transmission mode, the cyclic redundancy check (CRC) for the primary broadcast channel is performed and when detected to be in a predetermined range, that assumed transmission mode is considered as the detected transmission mode. After the transmission mode of the primary broadcast channel is blindly detected, the user terminal uses the transmission mode of the primary broadcast channel to determine which transmission mode to assume for the later decoded common and L1/L2 control channels, thus facilitating decoding of these control channels. This mechanism works because the number of antennas used for the primary broadcast channel also determines how many antennas are used for transmitting the later decoded control channels.

Figure 8:
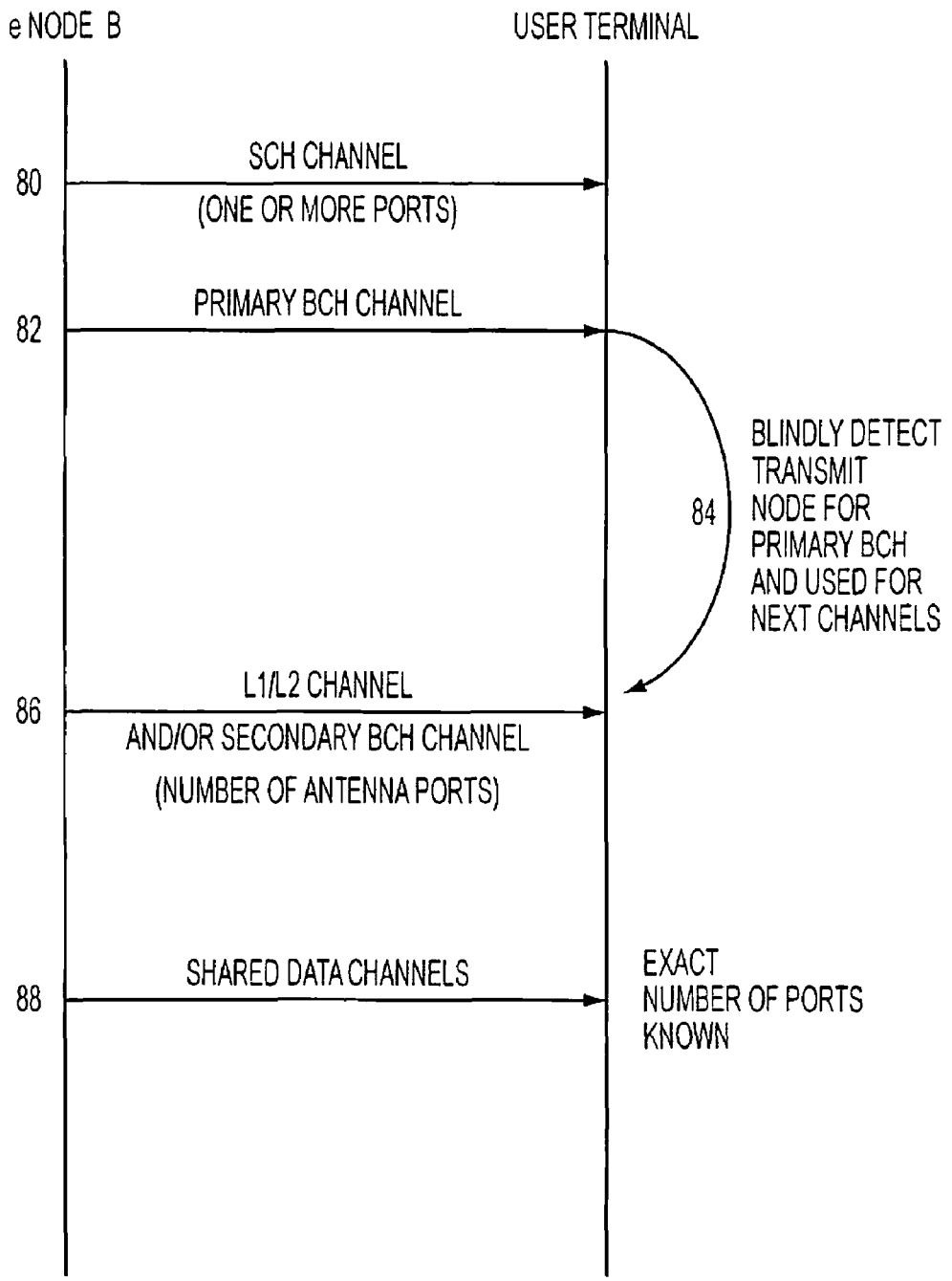
FIG. 8 is an exemplary illustration of communication channels used between the base station and the user terminal.

According to one exemplary embodiment, a process for determining the transmit mode of the base station is discussed with reference to FIG. 8. It is assumed in this embodiment that the common control and L1/L2 control channels may use either 2 Tx transmit diversity or 4 Tx transmit diversity. The user terminal is initially informed via the synch channel in step 80 that one or several antenna ports are used at least for the primary broadcast channel. Alternatively, the synch channel gives no information about the number of antennas and the present exemplary embodiment can be straightforwardly modified to encompass also this case. As discussed above, the synch channel does not inform the user terminal about the exact number of antenna ports when more than one antenna port is used by the base station. The user terminal receives in step 82 the primary broadcast channel and blindly detects which of the two transmit diversity schemes is used. The user terminal may perform the blind detection by decoding the primary broadcast channel under the assumption of both hypotheses (i.e., two antenna ports and four antenna ports) and determining which hypothesis gives the best CRC. The cyclic redundancy check is one approach to handle transmission errors as disclosed in Dahlman et al., 3G Evolution HSBA and LTE for Mobile Broadband, page 121, Elsevier, (2007), the entire content of which is incorporated here by reference.

If the 4 Tx transmit diversity is detected in step 84, then the user terminal knows that there are four antenna ports at the base station and the user terminal also knows that the same transmit diversity scheme is used for the L1/L2 control and/or the secondary broadcast channel. The user terminal then may start decoding these channels. Once these channels are decoded, the base station may transmit the exact number of antenna ports on these channels in step 86, instead of transmitting the same data on the primary broadcast channel. The explicitly signaled number of antenna ports may then be applicable to other channels (all or a subset of them), e.g. physical shared data channels such as PDSCH in LTE. Having the exact number of antenna ports used by the base station, the user terminal may start to receive data on the physical shared data channels in step 88. The physical shared data channels convey the user specific data on the logical data channels. But they may also be used to send the information corresponding to the secondary broadcast channel.

If the 2 Tx transmit diversity is detected in step 84, the user terminal is not aware whether two or four antenna ports are present at the base station. However, in this exemplary embodiment, the user terminal knows that the L1/L2 control and/or the secondary broadcast channel also uses the 2 Tx transmit diversity since the system is designed so that L1/L2 control and the secondary broadcast channel is using the same number of transmit antennas as the primary broadcast channel. Thus, the user terminal may decode in step 86 the L1/L2 control and/or the secondary broadcast channel without knowing the exact number of antenna ports configured in the cell. The number of antenna ports may then be signaled on one of these control channels, e.g., the secondary broadcast channel, in step 86 and the user terminal may start receiving data via the shared data channels in step 88, where these data channels are then using the number of transmit antennas signaled on the secondary broadcast channel.

Figure 9:
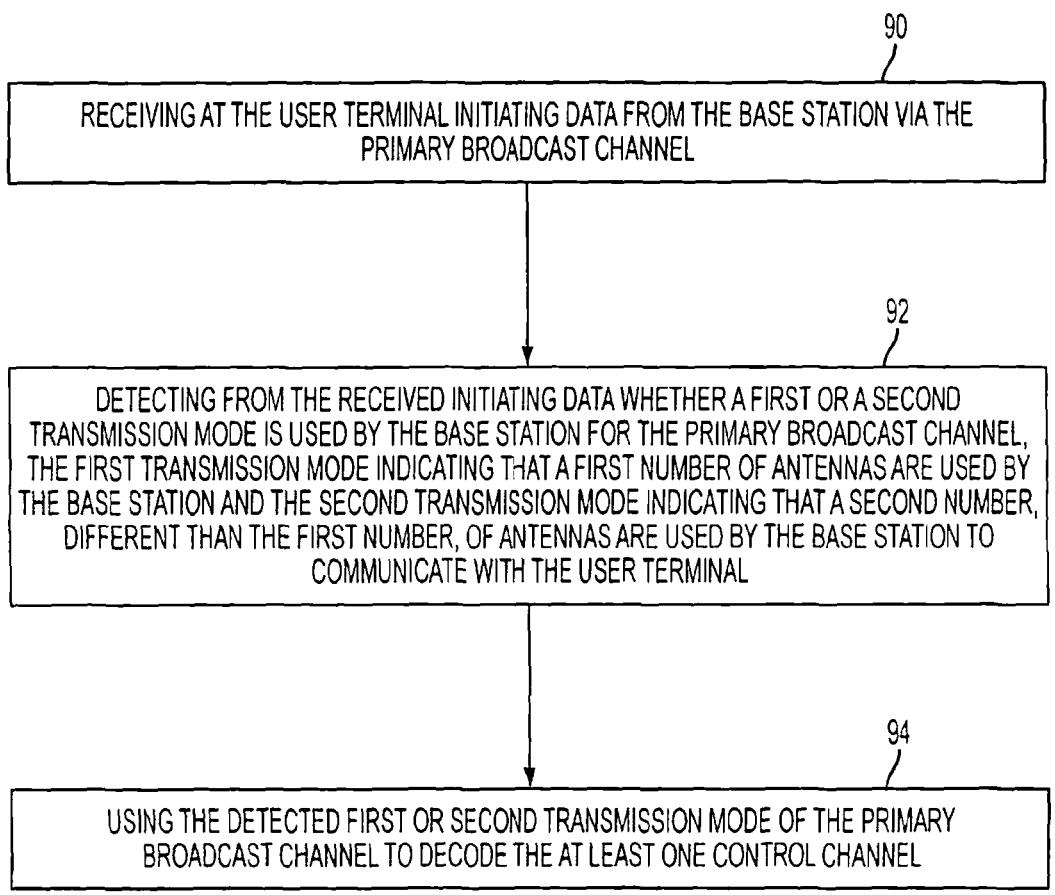
FIG. 9 is an exemplary flow chart illustrating steps for performing a method for selecting reception and decoding of first and second transmission modes at the user terminal according to an exemplary embodiment.

The steps of a method, according to an exemplary embodiment, for selecting reception and decoding of a first and second transmission modes at a user terminal are shown in FIG. 9. The user terminal receives via plural channels communicated information from a base station having multiple antennas, the plural channels include a primary broadcast channel and at least one control channel. According to the method in step 90 the user terminal receives data from the base station via the primary broadcast channel, in step 92 the user terminal detects from the received data whether a first or a second transmission mode is used by the base station, the first transmission mode indicating that a first number of antennas are used by the base station and the second transmission mode indicating that a second number, different from the first number, of antennas are used by the base station to communicate with the user terminal over at least one control channel. In step 94 the user terminal uses the determined transmission mode of the primary broadcast channel for assisting in decoding the at least one control channel.

Figure 10:
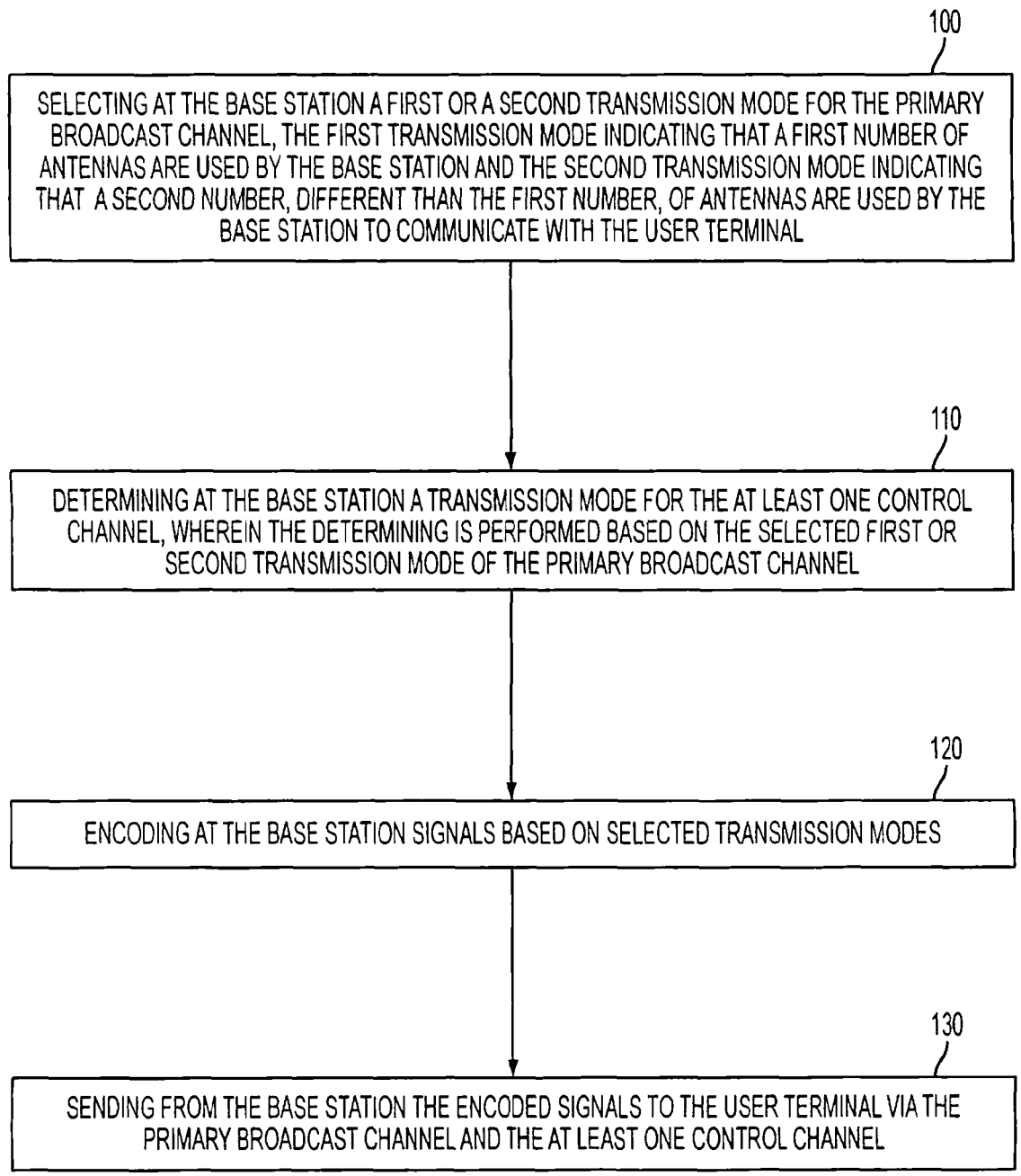
FIG. 10 is an exemplary flow chart illustrating steps for performing a method for selecting transmission and encoding of a transmission mode at a base station according to an exemplary embodiment.

According to another exemplary embodiment, there is illustrated in FIG. 10 a method for selecting at a base station transmission and coding of a transmission mode used by the base station to communicate information to a user terminal via plural channels, the base station having multiple antennas and the plural channels including a primary broadcast channel and at least one control channel. According to the method, in step 100, the base station selects a first or a second transmission mode for the primary broadcast channel, the first transmission mode indicating that a first number of antennas are used by the base station and the second transmission mode indicating that a second number, different than the first number, of antennas are used by the base station to communicate with the user terminal. In step 110, the base station determines a transmission mode for the at least one control channel, where the determining is performed based on the selected first or second transmission mode of the primary broadcast channel. In step 120, the base station encodes signals based on selected transmission modes, and in step 130 the base station sends the encoded signals to the user terminal via the primary broadcast channel and the at least one control channel.

Thus, one advantage of the discussed exemplary embodiments is avoiding signaling the number of antenna ports on the primary broadcast channel, allowing for fast processing based on the first and second antenna ports while still allowing transmit diversity modes (use of the full number of antenna ports available at the base station) for the common control and L1/L2 control channels. This may be beneficial in high speed scenarios where the reduced reference signal density for the third and fourth antenna ports would negatively impact the link quality of the control channels in case the four Tx transmit diversity mode is used. By allowing the number of transmit antennas used for the primary broadcast channel determine the number of transmit antennas used for the subsequent control channels and explicitly signal the number of transmit antennas on the secondary BCH or the other control channels, it becomes possible to use a different number of antennas for the shared data channels and the control channels. It also becomes possible to dynamically switch the number of antenna ports in the system by transmitting a new value of the number of antenna ports on the secondary broadcast channel, possibly in combination with some rule stating when the switch will occur. The above discussed exemplary embodiments may provide this benefit while avoiding the need to signal the number of antenna ports on the primary broadcast channel, where fitting additional information is a challenging task.

The disclosed exemplary embodiments provide a user terminal, a system, a method and a computer program product for selecting a transmission mode used by a base station when communicating with the user terminal. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The invention claimed is:

1. A method for selecting at a user terminal reception and decoding of a transmission mode used by a base station, the user terminal receiving communicated information from the base station, which has a number of antennas, via plural channels, the plural channels including a primary broadcast channel and at least one control channel, the method comprising:

receiving at the user terminal initiating data from the base station via the primary broadcast channel;

detecting from the received initiating data whether a first or second transmission mode is used by the base station for the primary broadcast channel, the first transmission mode indicating that a first number of the number of antennas is used by the base station and the second transmission mode indicating that a second number, different than the first number, of the number of antennas is used by the base station to communicate with the user terminal; and using the detected first or second transmission mode of the primary broadcast channel to decode data of the at least one control channel.

2. The method of claim 1, further comprising:

receiving an indication of the number of antennas used for transmission only via the at least one control channel, after the first or second transmission mode has been detected based on the primary broadcast channel.

3. The method of claim 1, wherein the detecting further comprises:

detecting at the user terminal, the first or second transmitting mode for the primary broadcast channel, without knowing the number of antennas at the base station.

4. The method of claim 1, wherein the number of antennas include one, two or four antennas.

5. The method of claim 1, wherein the plural channels further include a secondary broadcast channel and L1/L2 control channels.

6. The method of claim 1, wherein the primary broadcast channel has no message field available for transmitting an indication of the number of antennas used by the base station to communicate with the user terminal.

7. The method of claim 1, further comprising:
switching from one of the first and second transmission modes to another of the first and second transmission modes when decoding data of the primary broadcast channel and the at least one control channel after an indication of the number of antennas has been transmitted to the user terminal via the at least one control channel and after a preset time interval.

8. The method of claim 1, wherein the user terminal is configured to use a preset function of the detected first or second transmission mode of the primary broadcast channel to decode data of the at least one control channel.

9. A communication user terminal that selects a reception of a transmission mode of data transmitted from a base station, which has a number of antennas, via plural channels to the user terminal, the plural channels including a primary broadcast channel and at least one control channel, the user terminal comprising:
at least one antenna configured to receive initiating data from the base station via the primary broadcast channel; and
a processor connected to the at least one antenna and configured to detect from the received initiating data whether a first or second transmission mode is used by the base station for the primary broadcast channel, the first transmission mode indicating that a first number of the number of antennas is used by the base station and the second transmission mode indicating that a second number, different than the first number, of the number of antennas is used by the base station to communicate with the user terminal, and to use the detected first or second transmission mode of the primary broadcast channel to decode data of the at least one control channel.

10. The user terminal of claim 9, wherein an indication of the number of antennas used by the base station is received by the at least one antenna of the user terminal via a channel different from the primary broadcast channel, after the first or second transmission mode has been detected by the processor based on the primary broadcast channel.

11. The user terminal of claim 9, wherein the processor is further configured to detect the first or second transmission mode for the primary broadcast channel, without knowing the number of antennas at the base station.

12. The user terminal of claim 9, wherein the number of antennas at the base station is one, two or four.

13. The user terminal of claim 9, wherein plural channels further include a secondary broadcast channel and L1/L2 control channels.

14. The user terminal of claim 9, wherein the primary broadcast channel has no message field available for transmitting an indication of the number of antennas used by the base station to communicate with the user terminal.

15. The user terminal of claim 9, further comprising:
a switching unit configured to switch from one of the first and second transmission modes to another of the first and second transmission modes when decoding data of the primary broadcast channel and the at least one control channel, after an indication of the number of antennas at the base station has been transmitted to the user terminal via the at least one control channel and after a preset time interval.

16. The user terminal of claim 9, wherein the processor is further configured to use a preset function of the detected first or second transmission mode of the primary broadcast channel to decode data of the at least one control channel.

17. A communication network comprising:
a base station having a number of antennas and configured to transmit, via plural channels including a primary broadcast channel and at least one control channel, initiating data using a first or second transmission mode, the first transmission mode indicating that a first number of the number of antennas is used by the base station and the second transmission mode indicating that a second number, different than the first number, of the number of antennas is used by the base station to transmit the initiating data; and
a user terminal configured to receive the initiating data via the primary broadcast channel, to detect from the received initiating data whether the first or second transmission mode is used by the base station for the primary broadcast channel, and to use the detected first or second transmission mode of the primary broadcast channel to decode data of the at least one control channel.

18. A method for selecting at a base station transmission and coding of a transmission mode used by the base station to communicate information to a user terminal via plural channels, the base station having a number of antennas and the plural channels including a primary broadcast channel and at least one control channel, the method comprising:
selecting at the base station a first or second transmission mode for the primary broadcast channel, the first transmission mode indicating that a first number of the number of antennas is used by the base station and the second transmission mode indicating that a second number, different than the first number, of the number of antennas is used by the base station to communicate with the user terminal;
determining at the base station a transmission mode for the at least one control channel, wherein the determining is performed based on the selected first or second transmission mode of the primary broadcast channel;
encoding at the base station signals based on the selected first or second transmission mode; and
sending from the base station the encoded signals to the user terminal via the primary broadcast channel and the at least one control channel.

19. The method of claim 18, wherein an indication of the number of antennas used by the base station is sent to the user terminal via a channel different from the primary broadcast channel, after the first or second transmission mode has been detected by the user terminal based on the primary broadcast channel.

20. The method of claim 18, wherein the number of antennas at the base station is one, two or four.

21. The method of claim 18,
wherein the plural channels further include a secondary broadcast channel and L1/L2 control channels.

22. The method of claim 18, wherein the primary broadcast channel has no message field available for transmitting an indication of the number of antennas used by the base station to communicate with the user terminal.

23. The method of claim 18, further comprising:
switching from one of the first and second transmission modes to another of the first and second transmission modes when encoding data of the primary broadcast channel and the at least one control channel, after an indication of the number of antennas at the base station has been transmitted to the user terminal via the at least one control channel and after a preset time interval.

24. The method of claim 18, wherein the determining further comprises:
applying a preset function of the selected first or second transmission mode of the primary broadcast channel to determine the transmission mode for the at least one control channel.

25. A non-transitory computer readable medium storing computer executable instructions, wherein the instructions, when executed by a processor of a user terminal, cause the user terminal to select a transmission mode used by a base station, the user terminal communicating via plural channels with the base station, which has a number of antennas, the plural channels including a primary broadcast channel and at least one control channel, the instructions comprising:
receiving at the user terminal initiating data from the base station via the primary broadcast channel;
detecting from the received initiating data whether a first or second transmission mode is used by the base station for the primary broadcast channel, the first transmission mode indicating that a first number of the number of antennas is used by the base station and the second transmission mode indicating that a second number, different than the first number, of the number of antennas is used by the base station to communicate with the user terminal; and
using the detected first or second transmission mode of the primary broadcast channel to decode data of the at least one control channel.

26. A communication user terminal that selects a transmission mode of data transmitted from a base station, which has a number of antennas, via plural channels to the user terminal, the plural channels including a primary broadcast channel and at least one control channel, the user terminal comprising:
means for receiving initiating data from the base station via the primary broadcast channel; and
means for detecting from the received initiating data whether a first or second transmission mode is used by the base station for the primary broadcast channel, the first transmission mode indicating that a first number of the number antennas is used by the base station and the second transmission mode indicating that a second number, different than the first number, of the number antennas is used by the base station to communicate with the user terminal, and to use the detected first or second transmission mode of the primary broadcast channel to decode data of the at least one control channel.

* * * * *